United States Patent [19]

Tonyes et al.

[11] Patent Number: 4,713,250

[45] Date of Patent: Dec. 15, 1987

[54] DOG FOOD PALATABILITY ENHANCER AND PROCESS

[75] Inventors: Henry J. Tonyes, Bourbonnais, Ill.; William T. Keehn, Danforth, Ill.; Harold W. German, Clifton, Ill.; Brian S. Hill, Denton, Tex.

[73] Assignee: Gaines Pet Foods Corp., Chicago, Ill.

[21] Appl. No.: 872,125

[22] Filed: Jun. 9, 1986

Related U.S. Application Data

[63] Continuation-in-part of Ser. No. 595,080, Mar. 30, 1984, abandoned.

[51] Int. Cl.$^4$ .............................................. A23K 1/00
[52] U.S. Cl. ........................................ 426/2; 426/53; 426/56; 426/623; 426/630; 426/805
[58] Field of Search ............... 426/2, 98, 52, 53, 623, 426/630, 56, 805, 807

[56] References Cited

U.S. PATENT DOCUMENTS

| | | | |
|---|---|---|---|
| 3,119,691 | 1/1964 | Ludington et al. | 426/589 X |
| 3,202,514 | 8/1965 | Burgess et al. | 426/805 X |
| 3,617,300 | 11/1971 | Borochoff | 426/805 X |
| 3,745,021 | 7/1973 | Middlesworth et al. | 426/805 X |
| 3,857,968 | 12/1974 | Haas et al. | 426/805 X |
| 4,211,797 | 7/1980 | Cante | 426/805 X |
| 4,267,195 | 5/1981 | Boudreau et al. | 426/805 X |
| 4,391,829 | 7/1983 | Spradlin et al. | 426/805 X |
| 4,393,085 | 7/1983 | Spradlin et al. | 426/805 X |
| 4,477,472 | 10/1984 | Seto et al. | 426/98 |

Primary Examiner—R. B. Penland
Attorney, Agent, or Firm—Thaddius J. Carvis

[57] ABSTRACT

Disclosed is a process for preparing a composition which improves the palatability of dog foods. According to the process, a staged enzyme reaction is employed to first digest either a proteinaceous or an amylaceous substrate. The reaction product of the first stage is emulsified with fat, and the resulting emulsion is reacted with lipase and protease, under conditions effective to provide a material which, when applied to a dog food, significantly enhances its palatability. A preferred farinaceous substrate, to be acted upon by an amylase enzyme for the first stage reaction, is corn. Preferred proteinaceous substrates, to be acted upon by protease enzyme, for the first stage reaction include soy, whey, chicken skins, and cheese solids. The resulting product is produced rapidly, contains large quantities of free fatty acids, and has a high level of palatability.

14 Claims, No Drawings

DOG FOOD PALATABILITY ENHANCER AND PROCESS

This is a continuation in part of U.S. application Ser. No. 595,080, now abandoned, filed Mar. 30, 1984.

DESCRIPTION

1. Technical Field

The present invention relates to dog food, and more particularly to a new process for preparing a composition which will enhance the acceptability of dog foods, especially dry dog foods.

While the development and production of nutritious dog foods is well understood by those skilled in the art, there is a continuing problem of making these foods palatable. The attainment of palatability in dog foods is important from at least two standpoints. First, it assures that the dog will consume a sufficient quantity of the food to maintain a healthy existence. Secondly, it enables the use of large amounts of basic food ingredients and by-products from the human food industry. This helps to reduce the cost of human food production by providing a market for the by-products of this industry while at the same time minimizing the demand of the pet food industry for the choicer and more select raw materials which are suitable for human consumption.

2. Background Art

One approach to increasing palatability is through the addition of flavors and flavor-improving materials. For example, in U.S. Pat. Nos. 3,857,968 and 3,968,255 to G. J. Haas et al., there is disclosed a process for improving the palatability of animal foods such as dog foods based upon a lypolytic and proteolytic enzyme treatment of a mixture of fat and protein. The exact reason for the improvement in palatability is not identified by the patent. It is disclosed that the reaction produces a complex array of reaction products which may be responsible for the improvement.

The proteolytic digestion of proteinaceous materials is known to produce amino acids and polypeptides. In U.S. Pat. No. 4,211,797 to C. J. Cante et al., there is disclosed a dog food flavor which can comprise an enzymatic beef digest, fat, and a product prepared by the above disclosures of Haas et al. According to this disclosure, all components are separately prepared and then mixed. The beef digest is a second specialized proteinaceous material and plays no part in the separate reaction of the lipase and protease on the fat and protein according to the disclosure of Haas et al.

Amino acids and amino acid mixtures are known to have widely varying aromas and flavors depending upon their source, type, and concentration. There is nothing which indicates their inherent attractiveness to dogs. Thus, while U.S. Pat. No. 4,267,195 by J. Boudreau et al. discloses that L-proline, L-cysteine, L-histidine, and L-lysine are taste active in the dog, there is an apparent need to balance the level depending upon the particular composition of the dog food.

A more general reference to the flavorful effect of amino acids is made in U.S. Pat. No. 3,653,908 to Buck et al. which discloses an intermediate moisture animal food especially formulated for cats. While the reference indicates that acidic or enzymatic digestion of the food liberates flavorful amino acids, it is apparent from the conditions of processing that various reaction products of reducing sugars and amino acids are produced.

Further indicative of the effect of proteolytic digestion of proteinaceous ingredients of dog foods, is co-pending U.S. patent application Ser. No. 91,225 filed in the names of Franzen et al. on Nov. 5, 1979. Therein, it is disclosed that an enzyme selected from the group consisting of ficin, trypsin, bromelain, pepsin, and papain produces a reaction mixture which, when combined with the other ingredients of a dog food, increases the overall palatability of the food.

It is also known that various sugars improve the palatability of dog foods. For example, U.S. Pat. No. 3,617,300 to Borochoff et al. indicates that dextrose can improve the palatability of dog foods. According to the disclosed process, the starch content of a solid dog food is at least partially enzymatically converted to glucose by alpha-amylase and amyloglucosidase directly in the solid dog food. It was found that the combination of these two enzymes permitted the reaction to occur without adversely affecting the solid character of the dog food. In addition to the preparation of dextrose in situ such as by Borochoff et al., it was known previously to directly employ dextrose syrups which were prepared by enzymatically digesting corn apart from the other components of a dog food.

In U.S. Pat. Nos. 4,393,085 and 4,391,829 to Spradlin et al., it was found that by reacting a farinaceous material with both alpha-amylase and protease enzymes and reacting a proteinaceous material with protease enzymes, a composition highly flavorful to dogs could be prepared. According to the first of these disclosures, a combined slurry of farinaceous and proteinaceous materials is reacted in concert with the alpha-amylase and protease enzymes. According to the second, the farinaceous material is subjected to the enzymatic reaction first prior to conducting the reaction on the proteinaceous material alone or in the presence of the farinaceous material reaction product.

Thus, while considerable progress has been made in recent years through the development of a variety of dog food palatants, there is a need for additional procedures and products which provide yet further unrecognized alternatives for improving palatability.

DISCLOSURE OF THE INVENTION

In accordance with the present invention, an improved process for preparing a dog food palatability enhancer, the product of that process, a nutritionally balanced dog food including the palatability enhancer, and a process for preparing the dog food are provided.

A central feature of the present invention is the stagewise enzymatic digestion of the various substrates employed in the various enzymatic reactions involved such that unexpectedly good palatability results are achieved in a process having an overall high efficiency. The process for preparing the palatability enhancer, in its broad aspects, comprises: (a) preparing a first stage reaction product by dispersing a substrate comprising a proteinaceous or farinaceous material and reacting the substrate with an enzyme or enzyme mixture in amounts, under conditions of pH and temperature, and for a time effective to partially hydrolyze the substrate; (b) preparing an emulsion-comprising fat and said first stage reaction product; and (c) reacting said emulsion with lipase and protease in amounts, under conditions of pH and temperature, and for a time, effective to cause an enzyme reaction resulting in the production of a palatability improving composition.

The palatability enhancer according to the present invention can be employed to improve the palatability of virtually any food intended for consumption by dogs. The palatability enhancer is incorporated into the dog food or applied thereover in any manner effective to achieve the desired enhancement of palatability. The preferred usage is in nutritionally-balanced dog foods comprising fat, protein, carbohydrates, vitamins, and minerals and containing, on a weight basis, from about 20 to about 80% farinaceous ingredients and from about 20 to about 80% proteinaceous ingredients. Preferably, the palatability enhancer is applied to the surface of the dog food in conjunction with a fat coating.

The term "palatability" is broad and encompasses all of the various properties of dog foods which are sensed by the consuming animal and determine the overall acceptability of the food. Among these properties are texture, taste, and aroma. It is believed that the present invention increases palatability as a whole, primarily through improving the taste of the food.

The process of the invention can be employed to improve the palatability of virtually any dog food. Thus, the process can be employed in the preparation of dry, intermediate moisture, or canned dog foods. The dry dog foods can contain as much as 10% moisture without the need for high levels of antimicrobial agents. Dry dog foods typically have moisture contents of from about 8 to about 9% and usually have a dry, crunchy texture. Some dog foods are characterized as dry, but have moisture contents up to about 15% by weight and show a soft texture due, in part, to the additional water and, in part, to the plasticizing character of added agents, such as glycerol and propanediol. The intermediate-moisture foods are typically defined as those having moisture contents of above about 15% and less than about 50%, and typically will have a soft texture with a moisture content of less than about 30%. The canned dog foods will have moisture contents above 50%, and typically above 70%.

Typical of the dry, crunchy dog foods are those disclosed in U.S. Pat. No. 3,119,691 to Ludington et al. and the dry, crunchy portion of the dual-textured food taught in U.S. Pat. No. 4,190,679 to Coffee et al. Disclosed in both of these patents are dry, crunchy dog foods having an expanded structure. Both of these dry foods are prepared by admixing proteinaceous and farinaceous components, and extruding the admixture under conditions of temperature and pressure to cause expansion of the product as it exits the extruder.

Typical of the soft dry dog foods which can be improved according to the present invention are those described in U.S. Pat. No. 3,959,511 to Balaz et al. The product described therein has a moisture content of less than 15%, yet has a soft texture. A product with a slightly higher moisture content and a resilient meat-like character is described in the above-identified Coffee et al. patent. The resilient, meat-like character of the soft portion of the dog food described by Coffee et al. is prepared in a manner similar to that for the dry portion described therein. Significant differences, however, reside in the proportion of the ingredients, the use of plasticizing humectants, the moisture content, and the achievement of a fibrous external appearance. The two distinct portions described by Coffee et al. are prepared to maintain a sharp textural contrast throughout extended periods of storage. Because both types of pieces can be improved according to the present invention, the entire dual-textured pet food described by Coffee et al. can be improved or either portion of it can be improved for utilization within that type of product or independently.

Typical of the more conventional intermediate-moisture dog foods which can be improved in palatability according to the present invention are those disclosed in U.S. Pat. No. 3,202,514 to Burgess et al. According to that disclosure, proteinaceous meaty materials are cooked with stabilizing solutes in a first stage and then with the other added pet food materials, which can include farinaceous components, in a second state prior to shaping and packaging. Also susceptible to improvement according to the invention is the dog food described in U.S. Pat. No. 3,745,021 to Van Middlesworth et al. which describes an expanded intermediate-moisture pet food product.

Exemplary of the canned dog food products which can be processed in accordance with the present invention are those which contain meat balls comprising both proteinaceous meaty and farinaceous materials. Typically, the mixture of proteinaceous meaty and farinaceous materials is shaped, cooked to heat set the shape and then packaged in gravy. The method of the invention can be carried out in the same manner for dog foods of this type as would be for those of dry and intermediate moisture variety.

Accordingly, it can be seen that the present invention will be fully disclosed to those of ordinary skill in the art by describing it in detail with regard to any one of these product forms. Thus, the invention is described below for the exemplary case of dry products, but the teachings are fully applicable to intermediate-moisture and canned products.

While not limited to any particular type of process or product, those skilled in the art recognize that nutrition is of paramount importance. It is important that each dog food be nutritionally complete. Where this is done, it is not necessary for the dog owner to balance the quantities of different foods. Thus, the nutritional intake of the dog is assured so long as it intakes a minimum amount of food. Nutritionally-balanced foods will contain proteins, carbohydrates, fats, vitamins, and minerals in amounts established by feeding tests to be sufficient for proper growth and maintenance. To be sure that the dog does take a minimum amount of food over a period of time, it is essential that the food be palatable. The contribution of the present invention to palatability is important in this regard.

A preferred product of the invention will meet the nutritional requirements as set forth in Handbook Number 8, entitled, Nutrient Requirement of Dogs, which is published and amended by the National Research Council of the National Academy of Sciences.

The nutritionally-balanced dog foods prepared according to the present invention will comprise from 20 to 80% farinacous ingredients and from 20 to 80% proteinaceous ingredients. They are preferably prepared by expansion from an extruder to obtain a porous texture; however, they can be shaped by other conventional means to provide an unexpanded product or one which is texturized in other known ways. The products can be dried to a moisture content of less than 10% to provide either a soft or a crunchy texture depending upon the use of various plasticizers such as polyhydric alcohols or other texture-modifying ingredients.

There are several chunk-style dry dog food products on the market today which are particularly appealing to the consumer due to their shelf stability and convenience. These products are specifically formulated using proteinaceous and/or farinaceous source ingredients, and are characterized by a porous structure and crunchy texture. The products may be served as is but are preferably rehydrated with water prior to consumption by the dog. Typical of the dry dog food formulations which can be upgraded by the present invention are those described in U.S. Pat. No. 3,119,691. The palatability of these products is further enhanced by a coating of fat on the surface of the chunk or kib, over which coating may be applied a powdered gravy-forming material based on gums, starches, coloring, and flavoring material. Upon hydration, the gravy forming material serves to thicken and color the water, thereby simulating a gravy or meat sauce.

The products of the type described in U.S. Pat. No. 3,119,691 are in fact especially desirable because they are designed to employ a coating which hydrates with water to form a flavorful gravy. Such products may be manufactured by preparing a mixture of farinaceous and/or proteinaceous ingredients with optional vitamin and mineral supplements, said mixture having a moisture content within the range of about 20 to 50% by weight. The moisture content is reduced during subsequent processing.

The farinaceous mixture will include a primary farinaceous ingredient which may be any of the more common grains, such as corn, wheat, barley, oats, etc., and their derivatives, including, e.g., corn meal, red dog flour, wheat germ, etc. A preferred farinaceous ingredient may include hominy. Commonly, this ingredient will be present in an amount of 30 to 65% of the total mass.

In the preferred embodiment, the farinaceous mixture may also include one or more proteinaceous ingredients of vegetable, animal, or fish origin, typically soy bean meal, meat meal, or fish scrap. This ingredient, preferably present in an amount of 25 to 40% of the total mixture, will provide the bulk of the desired protein content in the final product. In the preferred embodiment, the ratio of farinaceous ingredient to proteinaceous ingredient may be about 1:1. The farinaceous ingredient and the proteinaceous ingredient together may comprise 55 to 95% of the total mixture.

It will be apparent that the proteinaceous ingredient will preferably be selected to provide both the necessary level or amount of protein and also the necessary nutrition. Preferably several proteinaceous ingredients will be present. More specifically, these ingredients will be selected to be complementary to each other and to the farinaceous ingredient whereby the final mixture is balanced with respect to desired amino acids. For example, the protein of corn is low in tryptophane, an essential amino acid, whereas fish meal is high in this component; similarly wheat is low in lysine whereas meat meal will provide this ingredient. Accordingly, mixtures of these complementary ingredients will preferably be used to provide the desired balance.

Other preferred ingredients in the product (typically present in total amount of 0.25% to 6% or 7%) may include: desired flavor ingredients typified by fish scrap (when this material is not used as the prime source of protein) or salt; coloring ingredients including iron oxide, etc.; fibrous ingredients typified by beet pulp; and desired vitamins.

The processing to form the dry, crucnchy portion can be in substantial accordance with the procedure set out in U.S. Pat. No. 3,119,691 to Ludington et al., the disclosure of which is hereby incorporated by reference. According to that disclosure, the ingredients are mixed, extruded, cut, dried, and then coated.

The dry ingredients are mixed together to form a mixture having a moisture content typically between 7 and 10%. The moisture content of the mixture is then raised to between about 20% and 30% by the addition of moisture in the form of water or steam with continued mixing for about 1 to 6 minutes.

The mixture is then fed to an extruder-cooker wherein it is subjected to mechanical working under pressure and at elevated temperatures, generally above 100° C. and typically between 115° C. and 150° C. Steam and/or water is typically injected to control moisture and temperature. Instead of the pre-moistening step mentioned above, all the additional moisture can be added during the extrusion-cooking step. The residence time of the mixture within the extruder is relatively short and is generally on the order of from about 15 to about 120 seconds. During this extrusion step, the farinaceous component of the mixture at least partially gelatinizes and expands.

The product exits the extruder through a suitable die of desired size to form an expanded rope structure having a reduced moisture content. The extruded rope is cut into the desired kib form and is then dried, generally stagewise, at temperatures between about 105° C. to 150° C. for about 5 to 20 minutes to a moisture content of from about 6 to 13%.

The resulting dry, crunchy pieces are then preferably coated with a palatability enhancer of the invention. While the enhancer could be incorporated prior to extrusion, this is less preferred because the impact of the enhancer is diminished.

The preparation of the palatability enhancer according the the present invention, in its broadest aspects, will comprise preparing a first stage reaction product by reacting a proteinaceous or farinaceous substrate with an enzyme or enzyme mixture in amounts, under conditions of pH and temperature, and for a time effective to partially hydrolyze the substrate; emulsifying the first stage reaction product with the fat; and then enzymatically treating that emulsion with lipase and protease in amounts, under conditions of pH and temperature, and for a time, effective to cause an enzyme reaction resulting in the production of a palatability enhancer. This stagewise treatment provides an enhancement not only in the efficiency and rate of the reaction, but in the degree of enhancement in palatability which is afforded by the resulting product. In addition, the resulting product contains increased levels of palatability enhancing free fatty acids.

While not known to be limited to specific proteinaceous substrates for preparation of the first stage reaction product, soy, whey, chicken skins, and cheese materials appear to provide the best results to date. Among the various soy products, soy flour is preferred. And, while delactosed whey is the whey source which has been investigated, the results would appear to extend to other whey products as well. Similarly, the results with dry cheese solids and emulsified chicken skins are believed to be translatable to other forms of these proteinaceous materials.

The protein employed in preparing the palatability enhancer can be any which provides a positive palatability response and should preferably be available in quantity at a reasonable cost. It is most practical to select a proteinaceous material which is effective not only for its contribution to palatability, but which, after reaction in the first stage of the process, provides a degree of emulsification necessary to fully emulsify the fat in the second stage of the process.

Where the substrate for the first stage reaction comprises a proteinaceous material, the enzyme effective to achieve the requisite partial hydrolysis will be a protease enzyme. Particularly preferred protease materials are those derived from *B. subtilis*, it is currently contemplated that any protease enzyme derived from plants, animals, or microorganisms can be employed as long as it is capable of providing the requisite improvement in palatability. In addition to protease from *B. subtilis*, plant proteases such as bromelain and papain, and animal-derived enzymes such as trypsin and pepsin can be employed. While the degree of reaction is dependent upon a number of factors, the proteolytic enzyme will typically be employed in an amount effective to provide generation of desired polypeptides to achieve palatability enhancement in the final product by partial hydrolysis of the protein, within the processing time desired.

The various proteolytic enzymes come in a wide variety of commercial forms, including dry, purified enzymes; enzymes supported on various soluble and insoluble carriers; and enzyme solutions of varying strength. For ease of handling, especially in view of the effectiveness of these materials on body tissues, we prefer to employ the enzyme in the form of a liquid solution. In the case where a protease enzyme is employed in the first stage to partially hydrolyze a proteinaceous material, the reaction is preferably continued at reactant concentrations, pH, and for a time, effective to convert at least a portion of the proteinaceous material to peptides ranging in size from 2 to 300 monomer units. More preferably, a portion of the proteinaceous materials are converted into peptides ranging in size from 2 to 50 monomer units. The reaction conditions will, of course, be selected to achieve the optimum results with the particular protease enzyme and protein substrate identified. The general reaction scheme will, however, be similar to that described for the enzymatic reaction described below where the first stage substrate comprises a farinaceous material.

In the case where a farinaceous material is employed in the first stage reaction, the farinaceous material can be any of these which are employed in the dog food composition itself or, if desired, can be a material different from those comprising the major proportion of the farinaceous ingredients. Of the farinaceous materials which can be employed, corn and wheat, preferably in their whole ground form, are the most preferred. Corn is the preferred farinaceous material tested to date and can be employed alone or in combination with wheat or a proteinaceous material. Wheat is desirable alone or in combination because it contains beta-amylase which further acts to hydrolyze the starch, but at points in its polymeric structure different from those subject to cleavage by alpha-amylase.

The slurry for enzymatically reacting the farinaceous material will typically contain from about 30% to about 70% water. The amount of water should be kept to the lowest level consistent with good reaction rate and flowability of the product. It is, of course, possible to employ higher quantities of water and provide for removing water at some point further along in the process to achieve the desired results. For example, where a high moisture content is employed in the slurry and the slurry is then admixed with the fat in the second stage, that reaction may be suitably efficient, but after application to the dog food, the product may require drying to prevent spoilage.

The amylase enzyme employed according to the present invention should be added in an amount which is effective to convert at least a portion of the farinaceous material to a mixture of oligosaccharides ranging in size from 1 to 10 monomer units. To provide reproducibility and process control, it is desirable to employ enzymes which are heat labile, thereby permitting them to be inactivated by simply heating them to a temperature effective for that purpose. Among the suitable enzymes are alpha-amylase, derived from plants, animals, or microorganisms. Preferably, a non-heat-stable bacterial alpha-amylase is employed which also has proteolytic action. Typical of these are alpha-amylase from *B. subtilis*.

Alpha-amylases randomly attack the alpha 1–4 bonds in a starch or dextrin molecule, resulting in the fragmentation of both linear and branched fragments of starch, i.e., dextrinization. Fungal alpha-amylase primarily converts linear glucose chains to maltose units as the final product. If sufficient time is allotted, under certain conditions, alpha-amylase alone can be made to convert linear glucose chains mostly to a mixture of maltose and dextrose, and branched fragments to a mixture of maltose, dextrose, and panose. The panose is a trisaccharide containing 1–6 linkages and, therefore, cannot be broken by the alpha-amylase. Thus, where both enzymes are employed in combination, as preferred, the bacterial alpha-amylase acts to rapidly break up the starch into dextrins and oligosaccharides and has some limited effect on the protein in the material, and the fungal alpha-amylase proceeds to split off individual maltose molecules from the non-reducing ends of these reaction products.

The exact reaction conditions for the enzymatic reaction will vary depending upon the particular type of enzyme and its source. Typically, however, it is preferred to select enzymes which react rapidly at temperatures within the range of from about 35° C. to about 120° C., preferably within the range of from about 43° C. to about 65° C. Employing enzymes which react within these temperature ranges will provide an efficient utilization of the heat of the reaction slurry when mixed with the reactants including fat in the second stage of the process.

As with the temperature, the pH will be dependent upon the particular type and source of enzyme; and, the enzymes should be selected to react effectively at pH conditions typical for the farinaceous ingredients involved, namely a pH within the preferred range of from about 3 to about 7.

It is preferred to complete the reaction as rapidly as possible to minimize the size of the reactor and the quantity of the heat required for the process. The reaction time is, however, dependent upon the other factors which control the rate of reaction. Within these constraints, reaction periods of from about 10 minutes to about 4 hours will be practical.

While it is desired to standardize a given reaction so that reaction for a given period of time will reproducibly yield the same degree of reaction, it is still necessary to check the reaction progress from time to time. According to one preferred embodiment of the invention, the reaction will be run sufficiently to reduce the viscosity to 50% of the original viscosity. More preferably the reaction is conducted until the viscosity is reduced to 25% of the original viscosity. Using this as an objective guide, it is preferable to employ sufficient enzyme to provide generation of desired monomer and polymer units effective to improve palatability in the final product within the processing time desired.

Following the first stage reaction, the first reaction product is then admixed with fat to form an emulsion which is then further reacted with lipase and protease. These enzymes can be added and the reactions effected sequentially; however, it is preferred that they be added as a mixture and that the second stage reaction be a combined hydrolysis of fat and protein. In the case where the first stage reaction product comprises a proteinaceous material, there will be no need to add additional proteinaceous material in the second stage reaction; however, of course, this can be done if desired. In the case where the first stage reaction substrate comprises a farinaceous material, the farinaceous material will include a portion of protein, but it is generally preferred to employ additional protein to the second stage reaction mixture to supplement the protein content of the farinaceous material.

The fats employed in preparing the palatability improving composition according to the present invention are preferably animal fats such as those naturally present in meat, bleachable fancy tallow, chicken fat, butter oil, and lard. While other fats can be employed, bleachable fancy tallow is preferred. It will be apparent to those skilled in the art that certain fats and oils such as cocoa butter, which, naturally or after conditioning, are unpalatable to animals, are not preferred according to the present invention.

The process for conditioning the mixture of fat and protein according to the second stage of the present invention broadly comprises emulsifying the fat and treating the mixture of protein and emulsified fat with lipase and protease. The reaction between the emulsified fat-protein mixture and the enzymes is presently believed to produce a complex array of reaction products. The fat reacts with the lipase to produce free fatty acids and mono- and diglycerides. The protein reacts with the protease to produce polypeptides and free amino acids. It is further possible that other reactions occur. The exact reactions and reaction products responsible for the unexpected improvement in the palatability of dog foods which is effected by the present invention are not presently identifiable. However, the overall reaction produces a real and reproducible improvement, and applicants do not wish to be bound to any specific theory as to which particular reaction or reaction product brings about the desired result of the present invention.

It is presently considered necessary to emulsify the fat before treatment with the enzymes. This is due to the fact that emulsification increases the fat-water interfacial area, thereby facilitating the heterogeneous reaction between the fat and the lipase. Emulsification can be obtained through the addition of an emulsifier; or, as in the case where the fat-protein mixture comprises a meat slurry, the meat slurry will impart a limited natural emulsifying effect. Where an emulsifier is added, it is preferably proteinaceous. Soy flour is a particularly preferred proteinaceous emulsifier for use according to the present invention. Obviously, however, a non-proteinaceous emulsifier can be employed. Typical of the non-proteinaceous emulsifiers are sodium stearoyl-2-lactylate and succinylated monoglycerides. While the exact concentration of the emulsifier is not presently believed critical, it is typically employed in amounts ranging from about 0.5% to 20% by weight based on the weight of the fat.

The lipase and protease employed according to the present invention may be derived from any suitable source as long as they contain effective amounts of these enzymes when used at concentrations which will not adversely affect the palatability of the dog food. Preferably, if an enzyme mixture is employed, it should contain from about 20 to 250 lipase units per gram and from about 500 to 7000 protease units per gram. Also, however, separate sources for the lipase and protease can be employed, and the enzymes added either simultaneously or sequentially. A lipase unit is defined as that amount of the enzyme which will hydrolyze 0.885 grams of olive oil calculated as triolein to diolein and oleic acid in two hours at 37° C. A protease unit is defined as that amount of the enzyme which will digest 1 mg. of casein in 1 minute at 50° C. at pH 7.5. Pancreatic lipase, which is an enzyme mixture containing about 220 lipase units per gram and about 6000 protease units per gram is a particularly preferred enzyme mixture. The exact concentration at which the enzymes, in a mixture or individually, are employed is not presently considered critical as long as the enzymes are present in amounts effective under the desired reaction conditions to cause an enzymatic reaction resulting in the production of the palatability enhancer. They are typically employed in amounts sufficient to supply from about 20 to 250 lipase units and about 500 to 7000 protease units per 100 grams fat. The enzymes can be admixed with the reaction mixture at any time before, during or after emulsification. Admixture after emulsification is, however, preferred.

To effect the reaction, the fat is admixed in liquid form with water, if desired the first stage reaction mixture and additional enzymes, vigorously agitated to effect emulsification, and maintained at suitable reaction conditions for a period of time sufficient to effect the reaction. In the case where the protein is to serve as an emulsifier, the protein is preferably present in the water before emulsification. In this case, it is preferably added and thoroughly admixed prior to adding the fat but can be added subsequent to fat addition. Where the fat is normally solid or plastic, it is preferably melted to the liquid state. The relative amounts of fat and water necessary for the reaction are not presently considered critical, but are desirably present at a fat-to-water ratio of from about 1:100 to 10:1, and preferably from about 1:4 to 1:1. The reaction mixture may also contain a promoter such as calcium chloride and sodium chloride.

It has been found that temperatures within the range of from about 35° C. to 50° C. are effective for both heating the reactants prior to admixture and for maintaining the reaction. This temperature range is, therefore, preferred; however, any reaction temperature effective to sustain the enzymatic reaction resulting in the production of the palatability enhancer can be employed. It is noted that lower temperatures (e.g., 20° C. to 35° C.) can be employed with somewhat diminished results due to incomplete emulsification and reduced reaction rates. Also, somewhat higher temperatures (e.g., 50° to 65° C.) can be employed but are generally more costly than the increased reaction rates will justify.

After emulsification, the enzymes are admixed with the emulsion and constant, efficient stirring is maintained for the reaction period to maintain a desirably high rate of reaction. The reaction will be continued for a period of time effective to sustain the enzymatic reaction resulting in the production of the palatability enhancing composition. Generally, it will be continued for a period of time ranging from about 5 minutes to 16 hours, typically from 15 minutes to two hours. Where the enzymes are added sequentially, the reaction in the presence of each enzyme will be continued for a period of time effective to provide the palatability enhancing composition as the product of the combined reaction periods.

It has been determined that the pH during reaction has an effect on palatability, with alkaline reaction conditions producing the more preferred results; however, the pH can be maintained at any level which is effective to sustain the enzymatic reaction resulting in the production of the palatability enhancing composition. Typically, the pH is adjusted periodically to bring it to within the range of from about 4 to 9, preferably about 7 to 9, and most preferably from about 7.0 to 7.5.

After the desired period of reaction, the emulsion can be treated to inactivate the enzymes. Typically, it can be heated to an elevated temperature, on the order of about 70° C. to 95° C., for a period of time sufficient to inactivate the enzymes, on the order of about 5 to about 15 minutes. Where the enzymes are added sequentially, it may be desirable to inactivate the first added enzyme, either the lipase or protease, before adding the second enzyme and continuing the processing. After completion of the reaction with the second of the two enzymes, the reaction mixture may again be heated to inactivate that enzyme.

The palatability enhancing composition is preferably maintained in the emulsified state for incorporation into the dog food. The emulsion can, if desired, be cooled or frozen and stored for extended periods of time.

The palatability enhancing composition can be incorporated into the dog food in any suitable manner. Application by spraying is particularly preferred for dry dog foods because it allows uniform surface application without breaking the emulsion. This makes it possible to obtain improved palatability with significantly smaller amounts of the palatability enhancing composition. Typical of a suitable device for spraying the emulsion onto the dog food is a spray gun of the kind commonly employed in spray painting. While the fat-to-water ratio of the emulsion is not believed to be critical during application of the emulsion to the dog food, it generally ranges from 1:5 to 1:1, and typically about 1:4. Where it is desired that the dog food have an outer coating of an unconditioned fat along with the palatability enhancer, the two materials can be applied sequentially or simultaneously. Preferably, the unconditioned fat and the palatability enhancing composition are applied together. The dog food may be dried after incorporation of the palatability enhancer to reduce the moisture content to the desired level.

The palatability enhancer prepared in this manner is generally applied in any effective amount. It has been found in practice that amounts as low as about 2.0 percent by weight based on the total weight of the dog food have provided significant improvement in palatability. Generally, amounts of greater than about 5% by weight based on the total weight of the dog food are not employed unless the dog food so treated is later diluted with another material such as untreated dog food, meat scraps, water, or the like.

BEST MODE FOR CARRYING OUT THE INVENTION

The following examples are presented for the purpose of further illustrating and explaining the present invention and describing the best mode presently known for carrying it out. These examples are not intended to be taken as limiting in any regard. Unless otherwise indicated, all parts and percentages are based upon the weight of the product or portion thereof at the indicated stage of the processing.

EXAMPLE 1

A series of palatability enhancers according to the present invention are prepared from the following basic formulations:

| Ingredients | Parts |
| --- | --- |
| Water | 49.0 |
| Substrate | 15.0 |
| Protease (runs A through E) | 0.03 |
| Amylase (run F) | 0.012 |
| NaCl | 1.81 |
| CaCl$_2$ | 0.042 |
| Tallow | 27.0 |
| Na OH | As needed |
| Lipase | 0.11 |

The following proteinaceous substrates were each separately employed according to the above formula, using a protease enzyme derived from *B. subtilis* having an assayed protease activity of 700 Northrup Units (NU) per gram, wherein 1 NU is that amount of enzyme which gives 40% hydrolysis of one liter of casein substrate in 60 minutes, under standardized conditions; and assayed alpha amylase activity of $2 \times 10^6$ Modified Wohlgemuth Units (WGU) per gram, wherein 1 WGU is defined as that amount of enzyme which will dextrinize one milligram of soluble starch to definite sized dextrins in thirty minutes under standardized conditions, and beta-glucanase activity:

(A) Heat-processed, ground soybeans
(B) Spray-dried blood plasma
(C) Dried, delactosed whey
(D) Whole dried egg
(E) Soy Flour In another run, the following farinaceous substrate was employed according to the above formula employing a mixture of enzyme including equal weights of a fungal alpha-amylase having an assayed activity of 800 Fungal Alpha-Amylase Units (FAU) per gram, wherein 1 FAU is the amount of enzyme which breaks down 5.26 g starch (Merck, Amylum Solubile Erg. B. 6, Batch 9947275) per hour at Novo's standard method for determination of alpha-amylase based upon the following standard conditions:

| Substrate | soluble starch |
| --- | --- |
| Reaction time | 7–20 minutes |
| Temperature | 37° C. |
| pH | 4.7 | and an alpha-amylase derived from *B. subtilis* having protease activity and an assayed amylase activity of 340,000 MWU per gram. The farinaceous substrate employed was:

(F) Whole ground corn

In each of runs A through F, the palatability enhancer was prepared by adding the water and substrate to a stirred kettle and vigorously agitating to provide a stable dispersion. After agitation, the enzyme (protease for runs A through E and amylase for run F) was added and the first stage reaction mixture was then maintained under agitation for 30 minutes at a temperature of about 38° C. The pH at the start of the reaction was in all cases about 5.0 to 6.5 and did not significantly change during the reaction. On completion of the 30-minute first stage reaction, the sodium chloride and calcium chloride were added to the first stage reaction mixture and dissolved. The tallow, which has been pre-heated to a temperature of about 60° C. to liquify it, was then added to the kettle and vigorously agitated sufficiently to form a stable emulsion. At this stage, a sufficient amount of sodium hydroxide was added to adjust the pH to about 7.5. The lipase (pancreatic lipase, which is a mixture of lipase and protease, having a lipase activity of about 6000 protease units per gram) was then added and thoroughly dispersed within the second stage reaction mixture which was then maintained at a temperature of about 43° C. for one hour while intermittently adding sufficient sodium hydroxide to control the pH to a level of about 7.5. Upon completion of the reaction, the enzymes in the resultant palatability enhancer were inactivated by heating to a temperature of about 77° C. to 88° C.

EXAMPLE 2

This example illustrates a preferred method according to the present invention for applying the dog food palatability enhancers as prepared in Example 1 to commercial, granular, dry dog food kibs of a number of different formulations.

The enhancers were mixed with tallow in the relative amounts indicated below and coated onto the dry foods. The moisture content of the products was about 9 to 10%. The samples identified by letter in the table correspond to the various substrates identified by similar letter in Example 1. Each of these samples was fed to a panel of 36 dogs to compare its palatability to that of a palatability enhancer prepared in accordance with the disclosure of U.S. Pat. No. 3,857,968 to Haas et al. Results as compared to that palatability enhancer are also set forth in the table.

TABLE 1

| Sample | Palatability Enhancer, Wt % | Tallow Wt % | Feeding Test Result |
| --- | --- | --- | --- |
| A | 3 | 7 | Equal |
| B | 3 | 7 | Equal |
| C | 2 | 4 | Improved |
| D | 2 | 4 | Equal |
| E | 2 | 4 | Improved |
| E | 2 | 4 | Decreased* |
| E | 2 | 4 | Improved |
| F | 3 | 7 | Improved |
| F | 2 | 4 | Equal |

*The results for this run were so different that it is our conclusion that errors were made in feeding.

EXAMPLE 3

The significance of the sequential reaction scheme according to the present invention is exemplified by comparing the palatability of sample E made in accordance with the present invention (hereinafter "sample E") with the palatability of a formulation utilizing the same ingredients as in sample E but prepared according to a different scheme (hereinafter "sample E'"). More specifically, sample E' is prepared by adding the salts and tallow along with the water and substrate prior to the first intensive mixing step to achieve an emulsion of the complete reaction mixture except for the enzymes at this stage. To this reaction mixture, the protease is then added and reacted for 30 minutes at 43° C. Similarly, as in Example 1, the reaction mixture is then adjusted to a pH of about 7.5 by adding sodium hydroxide after which the remainder of the reaction is as in the Example 1.

The palatability of sample E and sample E' are both separately compared against the palatability of products made in accordance with U.S. Pat. No. 3,857,968 to Haas et al. (hereinafter "Control") by feeding these materials to a panel of 36 dogs. The results were as follows:

|  | Average Preference Rating | No. of dogs preferring | | |
| --- | --- | --- | --- | --- |
|  |  | A | neither | B |
| A Sample E | .780 | 67.6 | 26.5 | 5.9 |
| B Control |  |  |  |  |
| A Sample E' | .446 | 20.0 | 42.9 | 37.1 |
| B Control |  |  |  |  |

In view of the preference for sample E over the Control and the preference of the control over sample E', it is indicative that sample E has a superior palatability compared to sample E'.

Sample E not only has greater palatability relative to control than sample E', but sample E also contains more free fatty acids than sample E' as evidenced by the greater usage of sodium hydroxide in preparing sample E as opposed to sample E'. Moreover, the reaction used to prepare sample E was much faster than that used to prepare sample E', thereby demonstrating improved reativity.

EXAMPLE 4

According to this example, a mixture of equal weights soy flour and whey (proteinaceous substrate) was employed as the first stage substrate and reacted as in Example 1. The remainder of the processing was as in Example 1.

EXAMPLE 5

According to this example, a mixture of equal weights of corn and wheat flour (farinaceous substrates) was employed as the first stage substrate and reacted as in Example 1. The remainder of processing was in Example 1.

EXAMPLE 6

According to this Example, a mixture of chicken skins and soy flour (proteinaceous substrates) was employed as the first stage substrate. The formula was as follows:

| Ingredients | Parts |
| --- | --- |
| Water | 37.0 |
| Chicken Skins | 24.0 |
| Soy Flour | 10.0 |
| Protease Enzyme | 0.20–0.33 |
| NaCl | 1.81 |
| $CaCl_2$ | 0.042 |
| Tallow | 20.0 |
| NaOH | as needed |

| Ingredients | Parts |
|---|---|
| Lipase | 0.11 |

The first stage reaction was conducted at 51° C. to 57° C., but otherwise all processing was done as in Example 1. When applied to a dry dog food as in Example 2 and fed to a dog test panel as in Example 3 against a control having the palatability enhancer E of Example 1, the dog food enhanced by the enhancer of this example was significantly preferred.

The above description is for the purpose of teaching those skilled in the art how to practice the invention and is not intended to recite all the possible modifications and variations thereof which will become apparent to the skilled worker upon reading. It is intended, however, that all such modifications and variations be included within the scope of the invention which is defined by the following claims.

We claim:

1. A process for preparing a dog food palatability enhancer, comprising:
   (a) preparing a first stage reaction product by dispersing a substrate comprising a proteinaceous or farinaceous material in water and reacting the substrate with an enzyme or enzyme mixture comprising amylase when the substrate comprises farinaceous material and protease when the substrate comprises proteinaceous material, in amounts, under conditions of pH and temperature, and for a time effective to partially hydrolyze the substrate;
   (b) preparing an emulsion comprising fat and said first stage reaction product; and then
   (c) reacting said emulsion with lipase and protease in amounts, under conditions of pH and temperature, and for a time, effective to cause an enzyme reaction resulting in the production of a palatability enhancer.

2. A process according to claim 1 wherein the substrate comprises at least one member selected from the group consisting of soy, whey, blood plasma, egg, chicken skins, and cheese, and the enzyme comprises a protease.

3. A process according to claim 2 wherein the substrate comprises at least one member selected from the group consisting of soy, whey, and a mixture of the two.

4. A process according to claim 2 wherein the substrate comprises at least one member selected from the group consisting of soy flour, chicken skins, and a mixture of the two.

5. A process according to claim 1 wherein the substrate comprises corn and the enzyme comprises amylase.

6. A process according to claim 5 wherein the substrate comprises whole ground corn and the amylase is derived from *B. subtilis*.

7. A process for preparing a dog food to improve palatability, comprising:
   (a) preparing a first stage reaction product by dispersing a substrate comprising a proteinaceous or farinaceous material in water and reacting the substrate with an enzyme or enzyme mixture comprising amylase when the substrate comprises farinaceous material, and protease when the substrate comprises proteinaceous material, in amounts, under conditions of pH and temperature, and for a time effective to partially hydrolyze the substrate;
   (b) preparing an emulsion comprising fat and said first stage reaction product;
   (c) reacting said emulsion with lipase and protease in amounts, under conditions of pH and temperature, and for a time, effective to cause an enzyme reaction resulting in the production of a palatability improving composition; and
   (d) incorporating said palatability improving composition into a dog food.

8. A process according to claim 7 wherein the dog food is nutritionally balanced for dogs in terms of its fat, protein, carbohydrate, and vitamin and mineral contents, and contains from 20 to 80% of farinaceous materials and from 20 to 80% of proteinaceous materials.

9. A process according to claim 7 wherein the substrate comprises at least one member selected from the group consisting of soy, whey, blood plasma, egg, chicken skins, and cheese, and the enzyme comprises a protease.

10. A process according to claim 8 wherein the substrate comprises at least one member selected from the group consisting soy, whey, and a mixture of the two.

11. A process according to claim 8 wherein the substrate comprises a member selected from the group consisting of soy, chicken skins, and a mixture of the two.

12. A process according to claim 7 wherein the substrate comprises corn and the enzyme comprise amylase.

13. A process according to claim 12 wherein the substrate comprises whole ground corn and the amylase is derived from *B. subtilis*.

14. An improved method of feeding dogs comprising:
   (a) preparing a dog food according to the process of claim 7 and
   (b) feeding said dog food to dogs.

* * * * *